(12) United States Patent
Tanji

(10) Patent No.: US 11,967,810 B2
(45) Date of Patent: Apr. 23, 2024

(54) WIRE HARNESS

(71) Applicant: SUMITOMO WIRING SYSTEMS, LTD., Yokkaichi (JP)

(72) Inventor: Seiya Tanji, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 281 days.

(21) Appl. No.: 17/441,485

(22) PCT Filed: Jan. 7, 2020

(86) PCT No.: PCT/JP2020/000127
§ 371 (c)(1),
(2) Date: Sep. 21, 2021

(87) PCT Pub. No.: WO2020/194983
PCT Pub. Date: Oct. 1, 2020

(65) Prior Publication Data
US 2022/0181861 A1 Jun. 9, 2022

(30) Foreign Application Priority Data
Mar. 28, 2019 (JP) .................................. 2019-064324

(51) Int. Cl.
*B60R 16/02* (2006.01)
*H02G 3/04* (2006.01)
(Continued)

(52) U.S. Cl.
CPC ....... *H02G 3/0468* (2013.01); *B60R 16/0215* (2013.01); *B60L 50/60* (2019.02); *H02G 3/0481* (2013.01); *H02G 3/32* (2013.01)

(58) Field of Classification Search
CPC ...... H02G 3/0468; H02G 3/32; H02G 3/0481; H02G 3/0406; H02G 3/0462;
(Continued)

(56) References Cited

U.S. PATENT DOCUMENTS 411,130 A * 9/1889 Robinson ................ F16L 23/06
285/419
1,607,943 A * 11/1926 Carson .................... F16L 17/04
277/614

(Continued)

FOREIGN PATENT DOCUMENTS

| JP | 2014-022219 A | 2/2014 |
| JP | 2014-050266 A | 3/2014 |
| JP | 2014-162274 A | 9/2014 |

OTHER PUBLICATIONS

English Translation JP2014/162274, Hiroaki et al., Sumitomo Wiring Systems Ltd (Year: 2014).*

(Continued)

*Primary Examiner* — Steven T Sawyer
(74) *Attorney, Agent, or Firm* — Oliff PLC

(57) ABSTRACT

A wire harness including: an electric wire; a metal pipe that accommodates the electric wire; and a clamp attached to an outer peripheral surface of the pipe, wherein: the pipe has a first lock formed on the outer peripheral surface of the pipe, and the clamp has a second lock configured to lock to the first lock in an axial direction of the pipe.

2 Claims, 4 Drawing Sheets

(51) Int. Cl.
*B60L 50/60* (2019.01)
*H02G 3/32* (2006.01)

(58) Field of Classification Search
CPC ... H02G 3/0691; B60R 16/0215; B60L 50/60; F16B 21/06; H01B 7/00; H01B 7/0045
See application file for complete search history.

(56) References Cited

U.S. PATENT DOCUMENTS

| | | | |
|---|---|---|---|
| 2,326,941 A * | 8/1943 | Heitner | F16B 7/0426 403/373 |
| 4,664,428 A * | 5/1987 | Bridges | F16L 21/005 285/373 |
| 9,502,153 B2 | 11/2016 | Adachi et al. | |
| 9,701,263 B2 * | 7/2017 | Hagi | B60R 16/0215 |
| 2011/0284285 A1 * | 11/2011 | Miura | H02G 3/32 174/70 R |
| 2015/0151693 A1 | 6/2015 | Inao et al. | |
| 2020/0169071 A1 * | 5/2020 | Kawaguchi | H02G 3/0468 |

OTHER PUBLICATIONS

JPS5896175 (Year: 1983).*
Mar. 10, 2020 International Search Report issued in International Patent Application No. PCT/JP2020/000127.

* cited by examiner

WIRE HARNESS

BACKGROUND

The present disclosure relates to a wire harness.

Conventionally, a wire harness has been known which includes a clamp that holds a metal pipe in which an electric wire is housed, the clamp being fixed to a vehicle body (e.g., see JP 2014-022219A).

SUMMARY

Incidentally, the metal pipe has a smooth outer peripheral surface. For this reason, if the clamp is attached to the metal pipe, there is a problem in that the clamp is easily positionally misaligned with respect to the pipe.

An exemplary aspect of the disclosure provides a wire harness capable of suppressing positional misalignment of the clamp.

The wire harness of the present disclosure includes: an electric wire; a metal pipe that accommodates the electric wire; and a clamp attached to an outer peripheral surface of the pipe, wherein: the pipe has a first lock formed on the outer peripheral surface of the pipe, and the clamp has a second lock configured to lock to the first lock in an axial direction of the pipe.

According to the wire harness of the present disclosure, an effect of being able to suppress positional misalignment of the clamp is exhibited.

DETAILED DESCRIPTION OF EMBODIMENTS

Figure 1:
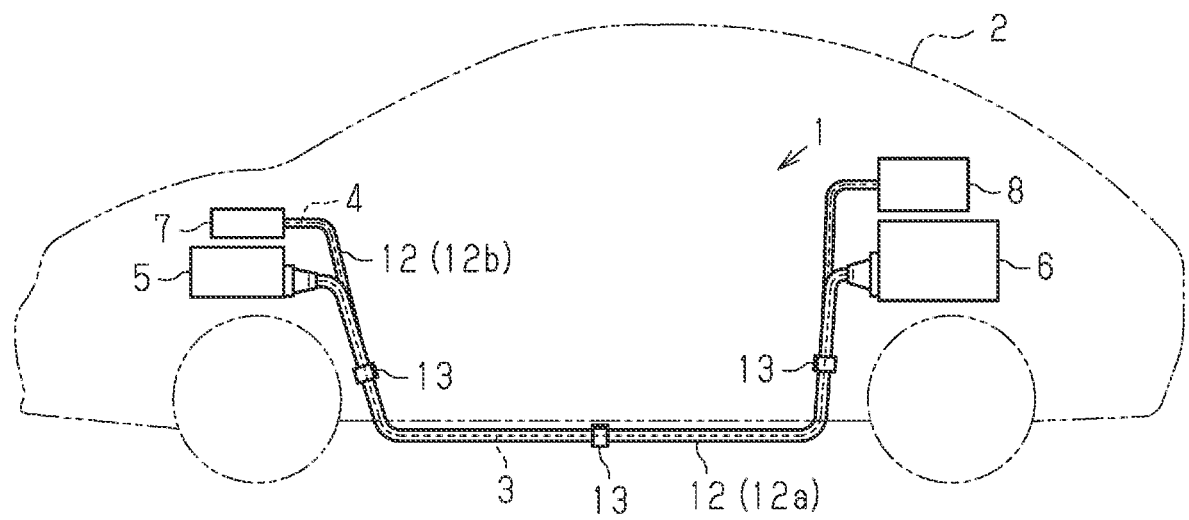
FIG. 1 is a schematic configuration diagram showing a wire harness of an embodiment.

Description of Embodiments of the Present Disclosure

First, embodiments of the present disclosure will be listed and described.

The wire harness of the present disclosure includes:

[1] an electric wire; a metal pipe for accommodating the electric wire; and a clamp to be attached to an outer peripheral surface of the pipe, in which the pipe has a first locking portion formed on the outer peripheral surface of the pipe, and the clamp has a second locking portion configured to lock to the first locking portion in an axial direction of the pipe.

According to this configuration, the first locking portion provided on the metal pipe and the second locking portion provided on the clamp are locked in the axial direction of the pipe. As a result, movement of the clamp in the axial direction of the pipe is restricted, and therefore it is possible to suppress a case in which the clamp is positionally misaligned in the axial direction of the pipe.

[2] It is preferable that at least one of the first locking portion and the second locking portion is formed over the entire periphery in the peripheral direction of the pipe to form a ring shape.

According to this configuration, at least one of the first locking portion and the second locking portion can be provided in a wide range, and therefore it is possible to suppress a case in which the clamp is positionally misaligned in the axial direction of the pipe.

[3] It is preferable that the first locking portion is provided as a pair of first locking portions arranged on both sides of the clamp in the axial direction.

According to this configuration, the clamp can be locked from both sides in the axial direction of the pipe by the pair of first locking portions, and therefore movement of the clamp in the axial direction of the pipe is restricted in both axial directions. For this reason, it is possible to suitably suppress a case in which the clamp is positionally misaligned in the axial direction of the pipe.

[4] It is preferable that the first locking portion is a protrusion that protrudes outward from the outer peripheral surface of the pipe in the axial direction of the pipe, the second locking portion is a recess that is provided on an inner surface of the clamp, and the protrusion is fit in the recess.

According to this configuration, the protrusion of the pipe is locked from both sides in the axial direction of the pipe by the inner surfaces of the recess formed in the clamp. In other words, each of the inner side surfaces of the recess is locked to the protrusion of the pipe in the axial direction of the pipe. As a result, movement of the clamp in the axial direction of the pipe is restricted in both directions in the axial direction, and therefore it is possible to suitably suppress a case in which the clamp is positionally misaligned in the axial direction of the pipe.

[5] The first locking portion of the pipe includes a pair of first locking portions provided at a predetermined interval in an axial direction of the pipe, each of the pair of first locking portions is a protrusion that protrudes outward from the outer peripheral surface of the pipe in the axial direction of the pipe, the second locking portion of the clamp includes a pair of second locking portions provided on both sides of the pair of first locking portions in the axial direction, and each of the pair of second locking portions is a protrusion that protrudes toward the pipe from the inner surface of the clamp.

According to this configuration, the pair of second locking portions are respectively locked to the pair of first locking portions in the axial direction of the pipe. As a result, movement of the clamp in the axial direction of the pipe is restricted in both directions in the axial direction, and therefore it is possible to suitably suppress a case in which the clamp is positionally misaligned in the axial direction of the pipe.

DETAILED DESCRIPTION OF EMBODIMENTS OF THE PRESENT DISCLOSURE

Specific examples of the wire harness of the present disclosure will be described below with reference to the drawings. Note that the present disclosure is not limited to these examples, and is indicated by the claims, and all modifications within the meaning and range of equivalency to the claims are intended to be encompassed therein. In each drawing, portions of the configuration may be shown exaggerated or simplified for convenience of description. Also, the dimensional proportions of the portions may differ from the actual dimensional proportions.

As shown in FIG. 1, the wire harness 1 is mounted on a vehicle 2 such as a hybrid vehicle or an electric vehicle. The wire harness 1 includes a high-voltage electric wire 3 that forms a high-voltage circuit and a low-voltage electric wire 4 that forms a low-voltage circuit. The high-voltage electric wire 3 electrically connects a device 5 such as an inverter mounted in the front portion of the vehicle 2 and a device 6 such as a high-voltage battery mounted in the rear portion of the vehicle 2. The inverter is connected to a wheel drive motor that is a power source for vehicle travel, generates AC power from a high-voltage battery, and supplies the AC power to the motor. The high voltage battery is a battery capable of supplying a voltage of, for example, several hundred volts.

The low-voltage electric wire 4 electrically connects a device 7 such as a fuse box mounted on the front portion of the vehicle 2 and a device 8 such as a low-voltage battery mounted on the rear portion of the vehicle 2. A low voltage battery is, for example, a battery capable of supplying a voltage of 12 volts. The wire harness 1 is arranged so as to pass under the floor of the vehicle 2, for example.

The high-voltage electric wire 3 and the low-voltage electric wire 4 are formed in an elongated shape so as to extend in the front-rear direction of the vehicle 2, for example. The high-voltage electric wire 3 can handle high voltages and large currents. The high-voltage electric wire 3 and the low-voltage electric wire 4 have, for example, a core wire formed by twisting a plurality of metal strands and an insulating covering for covering the core wire. The high-voltage electric wire 3 and the low-voltage electric wire 4 may be shielded electric wires having electromagnetic shield structures that shield from electromagnetic waves, or may be non-shielded electric wires that do not have shield structures. One end portion of the high-voltage electric wire 3 is connected to the device 5 via a connector, and the other end portion is connected to the device 6 via a connector. One end portion of the low-voltage electric wire 4 is connected to the device 7 via a terminal fitting, and the other end portion is connected to the device 8 via a terminal fitting.

Figure 2:
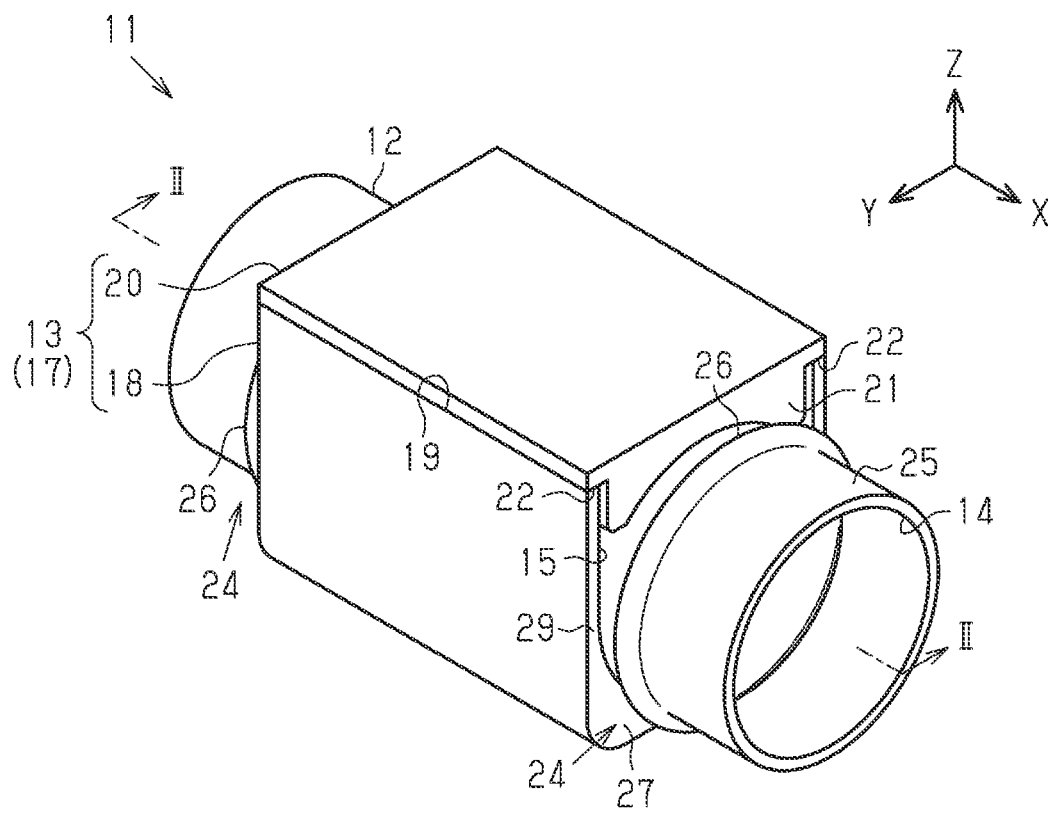
FIG. 2 is a schematic perspective view showing a portion of a wire harness of an embodiment.

As shown in FIG. 2, the wire harness 1 includes a harness unit 11 as a component that accommodates the high-voltage electric wire 3 and the low-voltage electric wire 4 and attaches them to the vehicle body. The harness unit 11 includes a harness pipe (hereinafter written as "pipe 12") in which the electric wires are accommodated, and a harness clamp (hereinafter written as "clamp 13") that is attached along the outer peripheral surface of the pipe 12. The electric wires are inserted into a through hole 14 of the pipe 12 that is formed therethrough in the axial direction. The pipe 12 of the present example includes a high-voltage-side pipe 12a in which the high-voltage electric wire 3 is accommodated and a low-voltage-side pipe 12b in which the low-voltage electric wire 4 is accommodated.

The clamp 13 is one or two or more members that hold the high-voltage-side pipe 12a and the low-voltage-side pipe 12b. The clamp 13 is made of resin. A through hole 15 extending in the axial direction (X-axis direction in FIG. 2) is formed in the clamp 13, and the pipe 12 is inserted through the through hole 15.

The pipe 12 is made of metal, and for example, a copper-based or aluminum-based metal material is used. The pipe 12 fulfills the role of shield structure that protects the high-voltage electric wire 3 and the low-voltage electric wire 4 from flying objects and water droplets, and protects the high-voltage electric wire 3 and the low-voltage electric wire 4 from electromagnetic waves. The high-voltage-side pipe 12a has a larger outer diameter than the low-voltage-side pipe 12b. The reason for this is because the high-voltage electric wire 3 accommodated inside has a larger electric wire diameter than the low-voltage electric wire 4. The wire harness 1 is fixed to a predetermined portion by attaching the clamp 13 to the pipe 12 and thereafter fixing the clamp 13 to a fixed portion such as a vehicle body. When the pipe 12 is attached, the clamp 13 can be rotated about the axis of the pipe 12.

Figure 3:
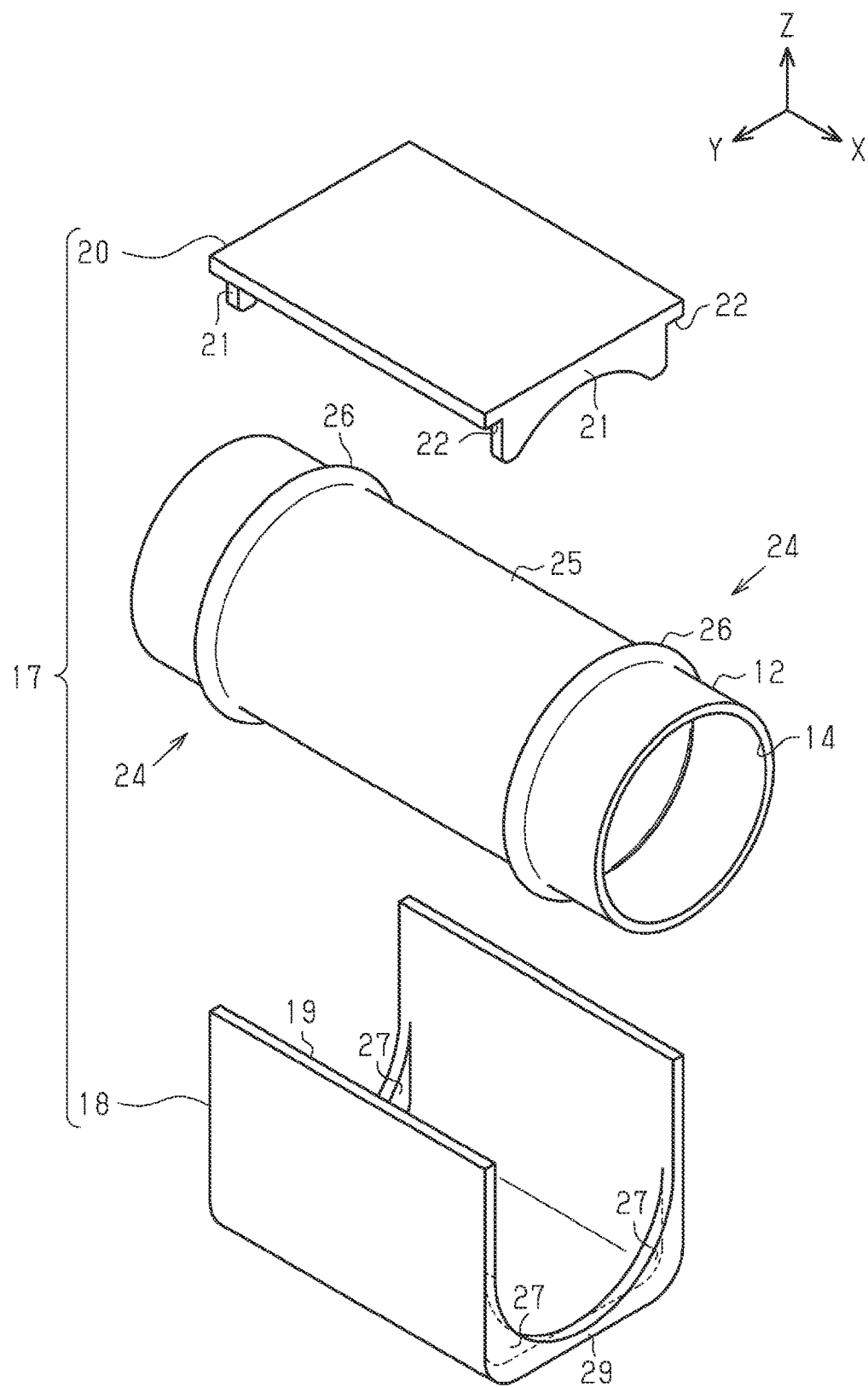
FIG. 3 is a schematic exploded perspective view showing a portion of a wire harness of one embodiment.

As shown in FIG. 3, a clamp main body portion 17 forming the main body portion of the clamp 13 includes a first component 18 that is U-shaped in cross section, and a plate-shaped second component 20 that is attached so as to close an opening 19 of the first component 18. Note that the clamp main body portion 17 refers to a portion of the clamp 13 to which the pipe 12 is to be attached. Step portions 22 are formed at both ends in the width direction (Y-axis direction in FIG. 3) of the second component 20, and the edges of the first component 18 are arranged on the step portions 22. A known structure such as a snap-fit structure can be used as the attachment structure of the first component 18 and the second component 20.

As shown in FIGS. 2 and 3, the pipe 12 and the clamp 13 are provided with a position restricting mechanism 24 that restricts the clamp 13 from being positionally misaligned in the axial direction of the pipe 12 (the X-axis direction of FIGS. 2 and 3). The position restricting mechanism 24 of this example restricts positional misalignment of the clamp 13 in the axial direction of the pipe 12 due to protrusions 26 being formed on the outer peripheral surface of a pipe main body 25 and the protrusions 26 coming into contact with the clamp 13. That is, in the present embodiment, the protrusions 26 correspond to the first locking portion (first lock). It should be noted that the pipe main body 25 refers to a portion of the pipe 12 to which the clamp 13 is to be attached.

The protrusions 26 protrude outward from the outer peripheral surface of the pipe 12 in the radial direction of the pipe 12. The protrusions 26 are formed by, for example, pressing a pipe base material, or the like. Recesses 26a are formed at positions corresponding to the protrusions 26 on the inner peripheral surface of the pipe 12. The protrusions 26 are formed so as to extend along the peripheral direction of the pipe 12. The protrusions 26 of the present embodiment are formed over the entire peripheral direction of the pipe 12 to form ring shapes. In the pipe 12 of the present embodiment, a pair of the protrusions 26 are provided at a predetermined interval in the axial direction of the pipe 12 (X-axis direction in FIGS. 2 and 3). The pair of protrusions 26 are provided on both sides of the clamp 13 in the axial direction of the pipe 12, for example. In other words, the clamp 13 is attached to the outer peripheral surface of the pipe 12 located between the pair of protrusions 26. When the clamp 13 of the present embodiment is attached to the outer peripheral surface of the pipe 12, it is sandwiched by the pair of protrusions 26 in the axial direction of the pipe 12.

Figure 4:
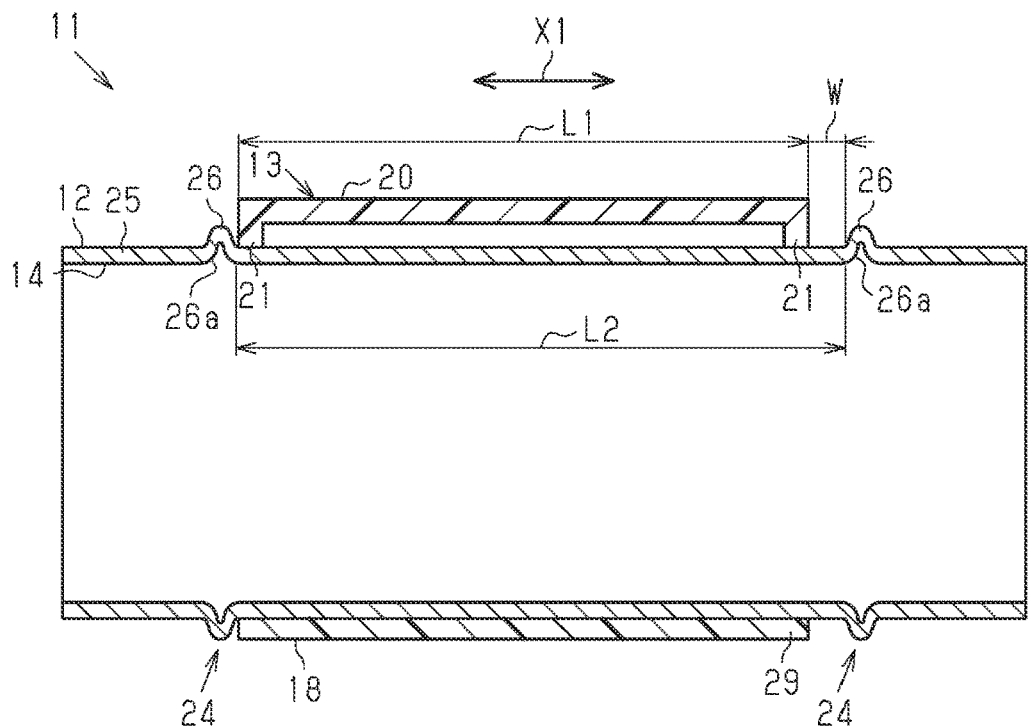
FIG. 4 is a schematic cross-sectional view (a cross-sectional view taken along line II-II in FIG. 2) showing a portion of a wire harness of an embodiment.

As shown in FIG. 4, protruding pieces 21 that come into contact with the protrusions 26 of the pipe 12 are formed on both ends in the axial direction of the second component 20 of the clamp 13 (both ends in the X1 direction in FIG. 4) during attachment. The protruding pieces 21 protrude toward the pipe 12 so that they can be locked with the protrusions 26 formed on the pipe 12. A total of two protruding pieces 21 of the present embodiment are provided at the end portions of the second component 20 according to the number of protruding portions 26 of the pipe 12. The surfaces of the protruding piece 21 are formed in circular arc shapes so as to match the outer peripheral surface of the pipe 12.

Returning to FIGS. 2 and 3, restricting walls 27 that come into contact with the protrusions 26 of the pipe 12 in the axial direction of the clamp 13 are formed on both ends in the axial direction of the first component 18 of the clamp 13 (both ends in the X-axis direction of FIGS. 2 and 3). A pair of the restricting walls 27 are arranged in the width direction of the clamp 13 (Y-axis direction in FIGS. 2 and 3). In the first component 18, the plurality of restricting walls 27 and a wall portion 29 supporting the restricting walls 27 come into contact with the protrusions 26 in the axial direction of the pipe 12.

In the clamp 13 attached to the pipe 12, a portion of the protruding pieces 21, a portion of the restricting walls 27, and a portion of the wall portion 29 overlap with the protrusions 26 in a plan view in the axial direction of the pipe 12. For this reason, in the clamp 13 attached to the pipe 12, a portion of the protruding pieces 21, a portion of the restricting walls 27, and a portion of the wall portion 29 can be locked to the protrusions 26 in the axial direction of the pipe 12 (X1 direction in FIG. 4). Specifically, in the clamp 13 attached to the pipe 12, a portion of the end surfaces in the X1 direction of the protruding pieces 21, a portion of the end surfaces in the X1 direction of the restricting walls 27, and a portion of the wall portion 29 can be locked to the protrusions 26 in the axial direction of the pipe 12. That is, in the present embodiment, the protruding pieces 21, the restricting walls 27, and the wall portion 29 correspond to the second locking portion (second lock).

The portions of the outer peripheral surface of the pipe 12 other than the portions at which the protrusions 26 are formed are formed smoothly, for example. That is, in the pipe 12, the protrusions 26 are locally formed on part of the outer peripheral surface, which is formed as a smooth surface overall. The protrusions 26 are formed continuously and integrally with, for example, portions of the outer peripheral surface other than the portions where the protrusions 26 are formed.

Returning to FIG. 4, the length L1 in the axial direction of the clamp 13 is formed to be smaller than the arrangement interval L2 of the pair of protrusions 26. For this reason, when the clamp 13 is attached to the pipe 12, play or a predetermined gap W is generated between the protrusion 26, the edge of the clamp 13, and the protrusion 26. The gap W is for absorbing the intersection in the pipe axial direction when the pipe 12 and the clamp 13 are attached.

Next, operations of the wire harness 1 of the present embodiment will be described with reference to FIG. 4.

When the pipe 12 is attached to the clamp 13, the clamp 13 is sandwiched by the pair of protrusions 26 provided on the pipe 12. At this time, part of the clamp 13 is locked to the protrusions 26 in the axial direction of the pipe 12. As a result, movement of the clamp 13 in the axial direction of the pipe 12 is restricted. For this reason, it is possible to make the clamp 13 less likely to shift in the axial direction of the pipe 12 with respect to the pipe 12.

Here, as a wire harness of a comparative example, a configuration example is conceivable in which the positions of the pipe 12 and the clamp 13 are restricted by collectively mounting the pipe 12 and the clamp 13 with an outer covering material such as adhesive tape or a protective material. In this case, since it is necessary to add an outer covering material, the cost increases accordingly. Also, depending on the mounting position on the vehicle body, the outer covering material deteriorates due to chipping or the like, which leads to the possibility that the pipe 12 will fall out of the clamp 13.

By contrast, in the wire harness 1 of the present embodiment, a configuration is used in which movement of the clamp 13 in the axial direction of the pipe 12 is restricted due to a pair of protrusions 26 being integrally formed on the pipe 12 and these protrusions 26 being locked to the clamp 13. For this reason, it is possible to suppress positional misalignment of the clamp 13 without using a separate member such as adhesive tape or a protective material. Accordingly, it is possible to suppress an increase in cost due to the addition of the outer covering material, and it is possible to preemptively suppress the occurrence of problems such as the clamp 13 falling off accompanying deterioration of the exterior material. Furthermore, the protrusions 26 are made of a metal material, and the rigidity of the protrusions 26 is higher than the rigidity of the clamp 13. For this reason, for example, even if an external force that moves the clamp 13 in the axial direction of the pipe 12 is applied to the clamp 13, it is possible to suitably restrict movement of the clamp 13 in the axial direction of the pipe 12 using the highly-rigid protrusions 26.

According to the wire harness 1 of the above embodiment, the following effects can be obtained.

(1) The wire harness 1 has a metal pipe 12 for accommodating a high-voltage electric wire 3 or a low-voltage electric wire 4, and a clamp 13 attached to the outer peripheral surface of the pipe 12. The pipe 12 has protrusions 26 formed on the outer peripheral surface of the pipe 12. The clamp 13 has protruding pieces 21 that lock to the protrusions 26 in the axial direction of the pipe 12, restricting walls 27, and a wall portion 29.

According to this configuration, the protrusions 26 formed on the pipe 12 and the protruding pieces 21, restricting walls 27, and wall portion 29 of the clamp 13 are locked to each other in the axial direction of the pipe 12. As a result, the movement of the clamp 13 in the axial direction of the pipe 12 is restricted, and therefore it is possible to suppress a case in which the clamp 13 is positionally misaligned in the axial direction of the pipe 12.

(2) The protrusions 26 are formed over the entire periphery in the peripheral direction of the pipe 12 to form a ring shape. According to this configuration, since the protrusions 26 can be provided in a wide range, it is possible to suitably suppress a case in which the clamp 13 is positionally misaligned in the axial direction of the pipe 12.

(3) The protrusions 26 are provided as a pair of protrusions 26 arranged on both sides of the clamp 13 in the axial direction of the pipe 12. According to this configuration, the clamp 13 can be locked from both sides in the axial direction of the pipe 12 by the pair of protrusions 26. For this reason, movement of the clamp 13 in the axial direction of the pipe 12 is restricted in both axial directions. As a result, it is possible to suitably suppress a case in which the clamp 13 is positionally misaligned in the axial direction of the pipe 12.

(4) By making the length L1 in the axial direction of the clamp 13 smaller than the arrangement interval L2 of the pair of protrusions 26, when the pipe 12 and the clamp 13 are attached, a gap W is formed between the protrusion 26, the edge of the clamp 13, and the protrusion 26. As a result, when the pipe 12 is fixed to the vehicle body with the clamp 13, positional adjustment with the fixing portion on the vehicle body side can be carried out in the axial direction of the pipe 12.

(5) The clamp 13 is rotatably attached to the pipe 12. In this manner, after the clamp 13 is attached to the pipe 12, the clamp 13 can be turned in the peripheral direction of the pipe 12. Note that during this rotation operation, movement in the axial direction of the clamp 13 with respect to the pipe 12 is restricted by the position restricting mechanism 24. Accordingly, when the pipe 12 is fixed to the vehicle body with the clamp 13, the pipe 12 can be positioned and attached while angle adjustment is performed with respect to the fixing portion on the vehicle body side.

OTHER EMBODIMENTS

Note that the above-described embodiment can be implemented with the following modifications. The above-described embodiment and the following modified examples can be implemented in combination with each other in a range in which no technical discrepancies occur.

Figure 5:
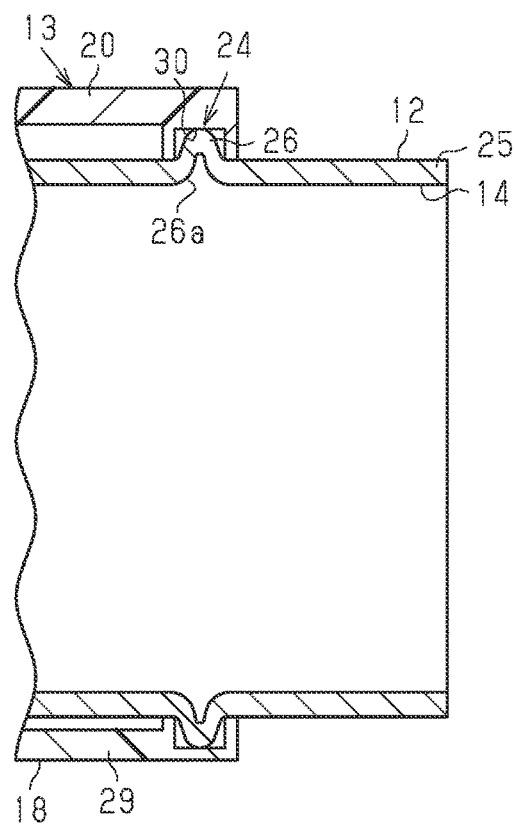
FIG. 5 is a schematic cross-sectional view showing a wire harness of a modified example.

As shown in FIG. 5, the position restricting mechanism 24 may have a structure in which the protrusion 26 is locked in a recess 30. In the case of the example of FIG. 5, a recess 30 is provided on the inner surface of the clamp 13 facing the outer peripheral surface of the pipe 12, and locking is performed such that the protrusion 26 of the pipe 12 fits in the recess 30. The recess 30 is formed on the inner surface of the clamp 13 over the entire periphery in the peripheral direction, aligned with the ring-shaped protrusion 26. According to this configuration, the protrusion 26 is locked from both sides in the axial direction of the pipe 12 by the inner surfaces of the recess 30. In other words, each of the two inner surfaces of the recess is locked to the protrusion 26 of the pipe 12 in the axial direction of the pipe 12. As a result, movement of the clamp 13 in the axial direction of the pipe 12 is restricted in both of the axial directions, and therefore it is possible to suitably suppress a case in which the clamp 13 is positionally misaligned in the axial direction of the pipe 12. Note that in this modified example, the recess 30 corresponds to the second locking portion.

Figure 6:
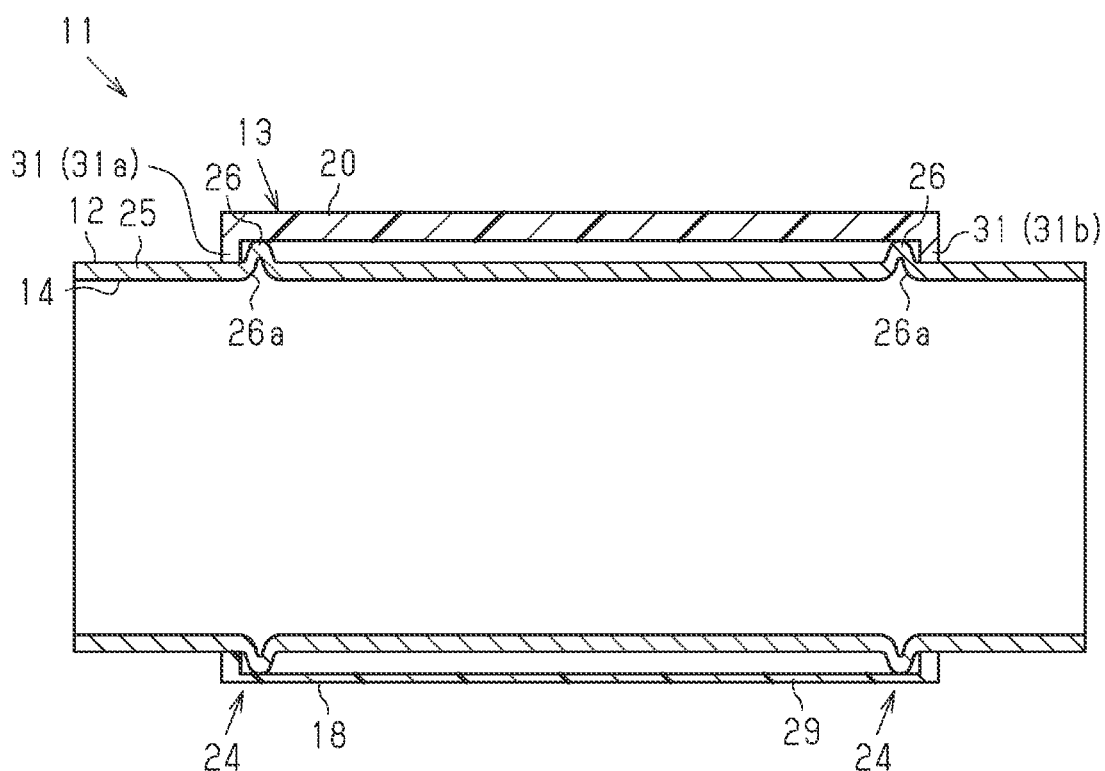
FIG. 6 is a schematic cross-sectional view showing a wire harness of a modified example.

As shown in FIG. 6, it is also possible to use a structure in which the position restricting mechanism 24 holds the pair of protruding portions 26 from the outside with both ends of the clamp 13 using protrusions 31 formed on the clamp 13. For example, a pair of protrusions 31a and 31b provided on both sides of the pair of protrusions 26 in the axial direction of the pipe 12 are formed on the clamp 13. The pair of protrusions 31a and 31b are provided on both ends of the clamp 13 in the axial direction of the pipe 12, for example. The protrusions 31a and 31b are formed so as to protrude from the inner surfaces of the clamp 13 toward the pipe 12, for example. According to this configuration, one protrusion 31a is locked to one protrusion 26 from the outside, and the other protrusion 31b is locked to the other protrusion 26 from the outside. As a result, movement of the clamp 13 in the axial direction of the pipe 12 is restricted in both of the axial directions, and therefore it is possible to suitably suppress a case in which the clamp 13 is positionally misaligned in the axial direction of the pipe 12. Note that in this modified example, the protrusions 31a and 31b correspond to the second locking portion.

Figure 7:
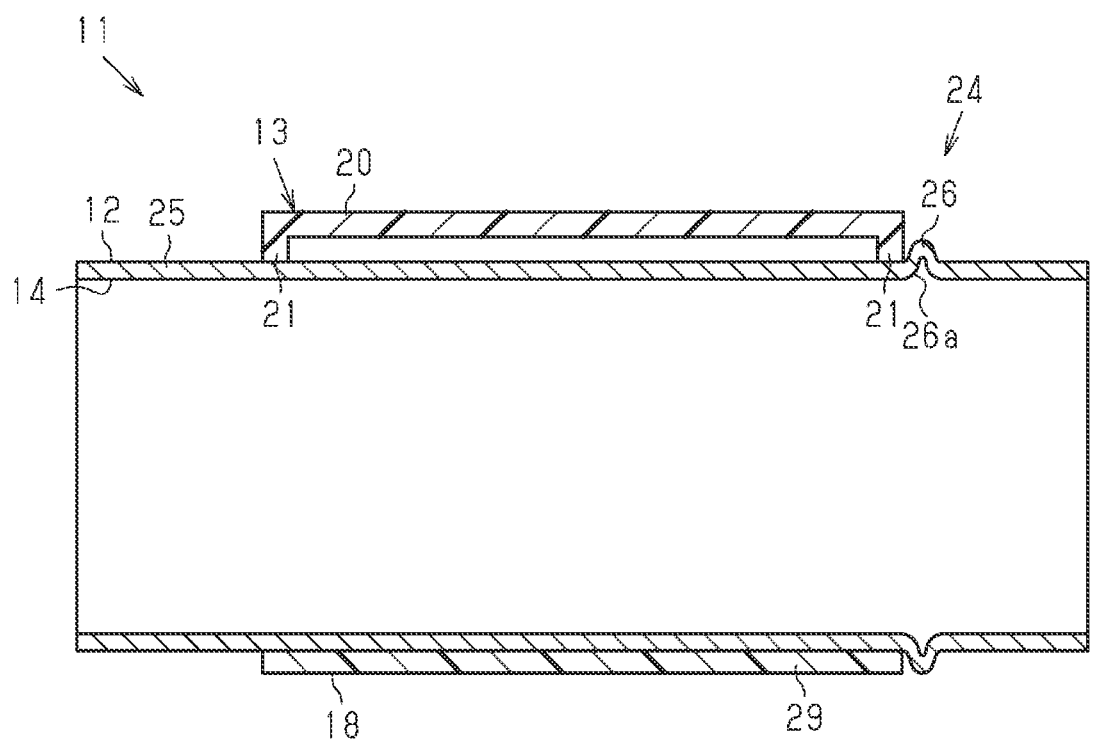
FIG. 7 is a schematic cross-sectional view showing a wire harness of a modified example.

As shown in FIG. 7, the position restricting mechanism 24 is not limited to including a pair of protrusions 26 in the axial direction of the pipe 12, and a protrusion 26 may also be provided on only one side. In this case as well, it is possible to make relative positional misalignment in the axial direction between the pipe 12 and the clamp 13 less likely to occur.

A resin layer may also be layered on the outer peripheral surface or the inner peripheral surface of the pipe 12. An example of the resin layer is, for example, colored paint indicating that a high-voltage electric wire is accommodated inside.

Although the pipe 12 in the illustrated example has a cylindrical shape, the pipe 12 may also have a polygonal cylindrical shape or an elliptical cylindrical shape.

The protrusion 26 is not limited to coming into contact with the protruding piece 21 in a state in which the clamp 13 is attached to the pipe 12, and may also come into contact with any position of the second component 20.

A plurality of the protrusions 26 may be provided, for example, at a predetermined pitch in the peripheral direction of the pipe 12.

If a plurality of protrusions 26 are provided, they may have different shapes.

The protrusions 26 are not limited to being arranged on both sides of the clamp 13, and for example, only one protrusion 26 may be provided near the center of the clamp 13.

The shape of the protrusion 26 is not limited to a shape with a quadrangular cross section, and can be changed to another shape such as an arc shape.

The first locking portion is not limited to the protrusions 26, and need only have a shape that can lock to the clamp 13.

The clamp 13 may also be, for example, a component constituted by three or more components.

The clamp 13 may also have a shape to which the pipe 12 can be attached by being inserted therein.

The clamp 13 may also be configured to clamp a plurality of pipes instead of a single pipe 12.

The portion of the second component 20 that comes into contact with the protrusion 26 is not limited to the protruding piece 21, and the second component 20 may also have, for example, a single circular arc-shaped thick portion in which a large portion of the underside of the second component 20 protrudes toward the pipe 12 instead of the two protruding pieces 21.

The wall portion 29 is not limited to the bottom wall of the first component 18, and preferably includes the side walls on both sides in the axial direction.

The portion of the first component 18 that comes into contact with the protrusion 26 is not limited to being constituted by the restricting wall 27 and the wall portion 29. For example, it is also possible to use a structure in which the restricting wall 27 is omitted from the first component 18, and only the wall portion 29 is in contact with the protrusion 26.

The second locking portion need only have a shape or structure that can come into contact with the protrusion 26.

The harness unit 11 is not limited to in-vehicle use, and may also be used in other apparatuses or devices.

As shown in FIGS. 2 and 3, the outermost surface of the protrusion 26 of the pipe 12 may be a convex surface with no edges or corners, which smoothly extends continuously from the outer peripheral surface of the pipe 12 in the axial direction of the pipe 12. According to this configuration, it is possible to suppress a case in which the components in the surrounding area of the pipe 12 are damaged by the protrusion 26.

As shown in FIGS. 4 to 7, the recess 26a corresponding to the protrusion 26 may also be a concave surface with no edges or corners, which smoothly extends continuously from the inner peripheral surface of the pipe 12 in the axial direction of the pipe 12. According to this configuration, it is possible to suppress a case in which the electric wire inserted through the pipe 12 is damaged.

As shown in FIGS. 4 to 7, the pipe 12 may also have a constant inner diameter, except for the position corresponding to the protrusion 26. According to this configuration, it is possible to avoid a decrease in the inner diameter of the pipe 12 accompanying the formation of the protrusion 26.

The invention claimed is:

1. A wire harness comprising: an electric wire; a metal pipe that accommodates the electric wire; and a clamp attached to an outer peripheral surface of the metal pipe, the clamp including (i) a first component that has an opening into which the metal pipe fits from a direction perpendicular to a longitudinal axis of the metal pipe and (ii) a second component that connects with the first component in the direction perpendicular to the longitudinal axis and closes the opening of the first component, wherein: the metal pipe has a first lock formed on the outer peripheral surface of the metal pipe, the first lock being a protrusion that protrudes outward from the outer peripheral surface of the metal pipe and is formed over an entire periphery of the metal pipe to form a ring shape, the clamp has a second lock configured to lock to the first lock in an axial direction of the metal pipe, the second lock including a recess that curves along part of the entire periphery of the metal pipe, wherein the protrusion fits inside the recess, the first lock of the metal pipe includes a pair of first locks provided at a predetermined interval in an axial direction of the metal pipe, each of the first locks is a protrusion that protrudes outward from the outer peripheral surface of the metal pipe, the second lock of the clamp includes a pair of second locks provided on both sides of the first locks in the axial direction, and each of the second locks include the recess and a protrusion that protrudes toward the metal pipe from an inner surface of the clamp.

2. The wire harness according to claim 1, wherein the second lock is formed over an entire periphery in a peripheral direction of the pipe to form a ring shape.

* * * * *